US008860393B2

(12) United States Patent
Kronmueller

(10) Patent No.: US 8,860,393 B2
(45) Date of Patent: Oct. 14, 2014

(54) PHASE LOCK LOOP CONTROLLED CURRENT MODE BUCK CONVERTER

(71) Applicant: Dialog Semiconductor GmbH, Kirchheim/Teck-Nabern (DE)

(72) Inventor: Frank Kronmueller, Neudenau (DE)

(73) Assignee: Dialog Semiconductor GmbH, Kirchheim/Teck-Nabern (DE)

( * ) Notice: Subject to any disclaimer, the term of this patent is extended or adjusted under 35 U.S.C. 154(b) by 62 days.

(21) Appl. No.: 13/736,114

(22) Filed: Jan. 8, 2013

(65) Prior Publication Data

US 2014/0184180 A1 Jul. 3, 2014

(30) Foreign Application Priority Data

Dec. 28, 2012 (EP) ..................................... 12392004

(51) Int. Cl.
*H02M 3/156* (2006.01)
*G05F 1/595* (2006.01)
*H02M 3/158* (2006.01)

(52) U.S. Cl.
CPC ..................................... *G05F 1/595* (2013.01)
USPC ............................. 323/284; 323/283; 323/285

(58) Field of Classification Search
USPC ........................... 323/282, 283, 284, 285, 351
See application file for complete search history.

(56) References Cited

U.S. PATENT DOCUMENTS

| 4,529,927 A | 7/1985 | O'Sullivan et al. |
| 4,929,882 A * | 5/1990 | Szepesi .......................... 323/222 |
| 5,929,620 A | 7/1999 | Dobkin et al. |
| 6,066,943 A | 5/2000 | Hastings et al. |
| 6,208,216 B1 | 3/2001 | Nasila |
| 6,774,611 B2 | 8/2004 | Umminger et al. |
| 6,934,672 B2 | 8/2005 | Hesse |
| 7,113,011 B2 | 9/2006 | Leung et al. |
| 7,268,526 B1 | 9/2007 | Smith |
| 8,350,548 B2 * | 1/2013 | Tang et al. ..................... 323/282 |
| 2008/0067993 A1 | 3/2008 | Coleman |
| 2010/0301827 A1 | 12/2010 | Chen et al. |
| 2013/0038300 A1* | 2/2013 | Yanagida ....................... 323/271 |

FOREIGN PATENT DOCUMENTS

| EP | 1 632 827 | 3/2006 |
| EP | 2 230 755 | 9/2010 |

OTHER PUBLICATIONS

European Serach Report, 12392004.3-1804, Mailed: Jun. 3, 2013, Dialog Semiconductor GmbH.
"A Fast-Response Pseudo-PWM Buck Converter With PLL-Based Hysteresis Control," By Yanqi Zheng et al., IEEE Transactions on Very Large Scale Integration (VLSI) Systems, vol. 20, No. 7, Jul. 2012, pp. 1167-1174.

* cited by examiner

*Primary Examiner* — Gary L Laxton
(74) *Attorney, Agent, or Firm* — Saile Ackerman LLC; Stephen B. Ackerman; Billy Knowles

(57) ABSTRACT

A current mode buck converter has a power stage and a feedback stage. The power stage converts a higher power supply voltage level to a lower output voltage level. The feedback stage is connected with the power stage for controlling the levels of repetitive switching of an output current by phase and frequency locking a switching frequency of the output current to an external clocking signal. The feedback stage controls two levels of output current bounds by transforming a current error to a phase error to prevent error amplification such that an average output current remains constant at any duty cycle.

23 Claims, 6 Drawing Sheets

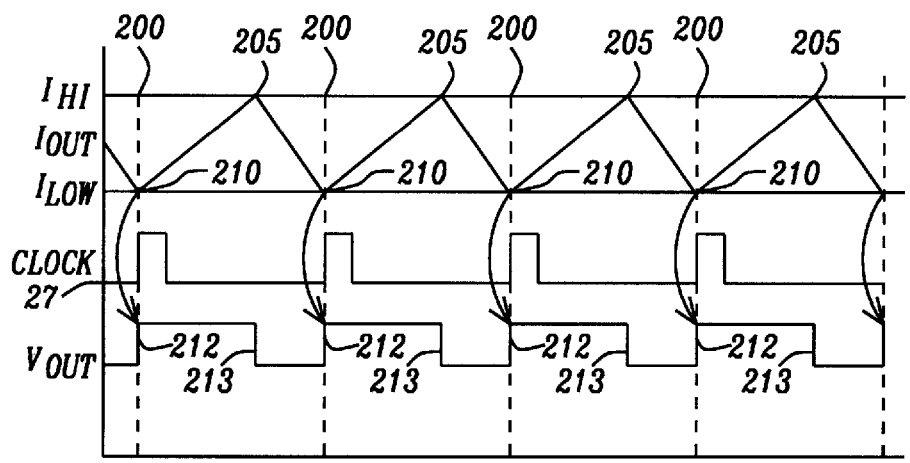
FIG. 4a – Related Art
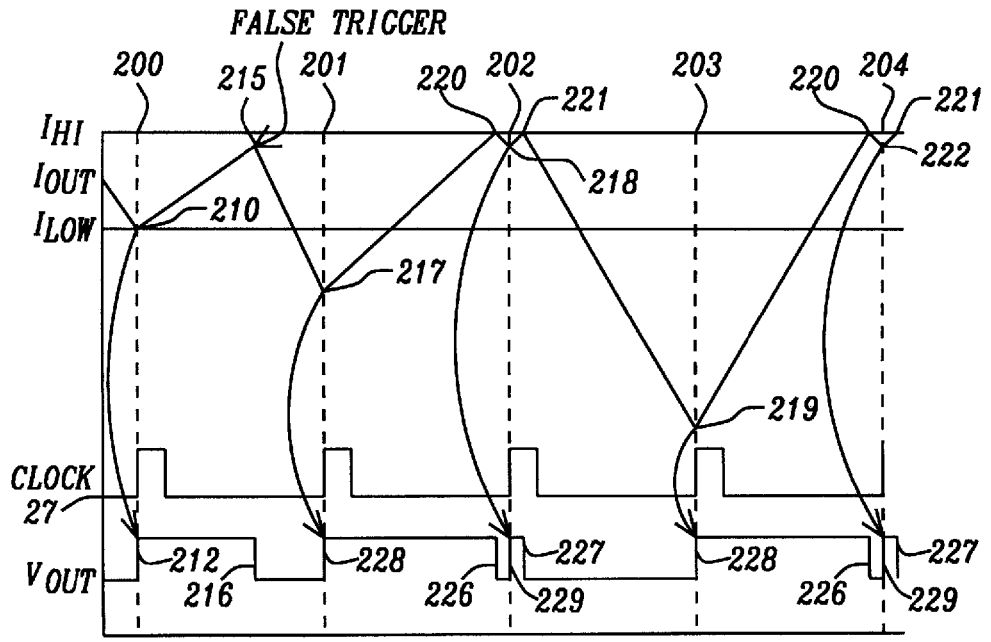
FIG. 4b – Related Art

PHASE LOCK LOOP CONTROLLED CURRENT MODE BUCK CONVERTER

TECHNICAL FIELD

This disclosure relates generally to circuits and methods for controlling operation of switching power converters. More particularly, the present disclosure relates to circuits and methods for controlling operation of a current mode buck converter to maintain stability over all duty cycles.

BACKGROUND

A buck converter consists of a power stage and a feedback control circuit. The power stage has a switching section and an output filter. The power stage switches an input node to the output filter between the power supply voltage source and the ground reference voltage source. The output filter has an inductor between the input node and an output node with a capacitor connected between the output node and the ground reference node. In a current mode buck converter, the feedback control circuit has a single control loop that monitors the output voltage and the current flowing through the inductor to control the duty cycle of the power stage.

Refer now to FIG. 1 for a more detailed description of a current mode buck converter of the related art. The power switching section 15 of the power stage 5 has a pulse oscillator 25 that generates a set of pulses at a fixed repetition rate. The set of pulses 27 is applied to the set input S of a set-reset latch 30. The output Q of the set-reset latch 30 is applied to an input of a driver circuit 35. The output of the driver circuit is applied to the commonly connected gates of the PMOS transistor MP1 and the NMOS transistor MN1. The source of the PMOS transistor MP1 is connected to the power supply voltage source VDD and the source of the NMOS transistor MN1 is connected to the substrate supply voltage source VSS. The substrate supply voltage source VSS is often the ground reference voltage source, but in some applications is a negative voltage level. The commonly connected drains of the PMOS transistor MP1 and the NMOS transistor MN1 are connected to an input terminal of the filter section 20. The input terminal is a first terminal of an inductor L1. When the set of pulses 27 as applied to the set input S of a set-reset latch 30, triggers the set-reset latch 30 such that the PMOS transistor MP1 is turned on and the NMOS transistor MN1 is turned off, a current from the power supply voltage source VDD from the first terminal of the inductor L1 out the second terminal of the inductor L1 into the first terminal of the output capacitor $C_{OUT}$ and to the substrate supply voltage source VSS. The output voltage $V_{OUT}$ present at the junction of the second terminal of the inductor L1 and the output capacitor $C_{OUT}$.

It is known in the art, that the voltage ($V_{L1}$) across the inductor L1 is determined by the formula:

$$V_{L1} = L\frac{dI_L}{dt}$$

The output voltage $V_{OUT}$ is equal to the difference of the power supply voltage source and the voltage $V_{L1}$ across the inductor L1 in the on state and equal to the negative of the voltage $-V_{L1}$ across the inductor L1 in the off state. The duty cycle of the current mode buck converter determines the on state time and the off state time. It can be shown that the output voltage $V_{OUT}$ is equal to the duty cycle D of the current mode buck converter multiplied by the voltage level of the power supply voltage source VDD.

The feedback section 10 has two inputs. The first input is the output voltage $V_{OUT}$ at the first terminal of the output capacitor $C_{OUT}$ and the second input is a sensing of the output current through the inductor L1. In some applications, the sensing of the output current $I_{OUT}$ is measured as a voltage across the equivalent series resistance of the inductor L1, a voltage across a small series resistor (not shown) placed in series with the inductor L1, or a voltage resulting from a magnetic coupling with an interconnection of the inductor L1 and the output capacitor $C_{OUT}$.

The first input of the feedback section 10 is applied to first input of an error amplifier 40. A second input of the error amplifier 40 received a reference voltage level Vref. The output the error amplifier 40 is an error voltage that is applied to a negative input of a comparator 45. The second input of the feedback section 10 is applied to the positive input of the comparator 45. When the error voltage $V_{ERROR}$ indicates that the output current $I_{OUT}$ is greater than a high current level $I_{HI}$ as established from the reference voltage Vref, the comparator 45 triggers the reset input R of the set-reset latch 30 and the PMOS transistor MP1 is turned off and the NMOS transistor MN1 is turned on. The first terminal of the inductor L1 is then connected through the NMOS transistor MN1 to the substrate supply voltage source VSS. The slope of the output current the reverses direction and the output current decreases at the slope determined by the magnitude of the output voltage $V_{OUT}$ and value of the inductor L1. At the next pulse of the pulse oscillator 25, the switching transistors MP1 and MN1 are toggled in state to generate saw tooth current wave for the output current $I_{OUT}$.

FIG. 2 is a plot of the output current $I_{OUT}$ of the inductor L1 of FIG. 1 illustrating instability in a current mode buck converter of the related art. In physical implementations of a current mode buck converter, as is known in the art, the error amplifier 40 and the load circuit and the output capacitor $C_{OUT}$ each provide a right hand pole in a gain vs. frequency (Bode) plot. In order to provide the regulation needed for the power supply, a very high DC gain is needed within the feedback section 10. The high gain and the right hand pole of the error amplifier 40 each introduce the possibility of instabilities that may cause subharmonic oscillations. Referring to FIG. 2, the plot of the clock represents periodic output pulses of the pulse oscillator 25 that sets the set-reset latch 30 at the minimum $I_{MIN}$ of the output current $I_{OUT}$ to turn on the PMOS switching transistor MP1 and turn off the NMOS switching transistors MN1. If the feedback network 10 has an instability, the comparator 45 will cause a false triggering 50 of the reset R of the set-reset latch 30. At the next clock pulse, the set-reset latch 30 is set to turn on the PMOS switching transistor MP1 and turn off the NMOS switching transistors MN1. The amplitude of the output current $I_{OUT}$ has now decreased to a lower level that required by the minimum output current $I_{MIN}$. This indicates a loss of control of the regulation of the converter. When the output current $I_{OUT}$ reaches the high level output current $I_{HI}$, the comparator then triggers the reset R terminal of the set-reset latch to turn off the PMOS switching transistor MP1 and turn on the NMOS switching transistors MN1. The output current $I_{OUT}$ the decreases until the next clock pulse of the pulse oscillator 25 that sets the set-reset latch 25 to turn on the PMOS switching transistor MP1 and turn off the NMOS switching transistors MN1. This has happened too soon thus causing the waveform of the output current $I_{OUT}$ to appear to be modulated with a subharmonic frequency. This causes unwanted noise in the output voltage $V_{OUT}$.

This subharmonic noise is generally caused when the duty cycle of the output current $I_{OUT}$ to be greater than 50% and the error current being amplified. The control feedback stage 10 is unable to regulate this error and requires external ramp compensation. As is known in the art, the ramp compensation must be adjusted whenever the output voltage $V_{OUT}$ or the inductor L1 needs to be changed. To avoid these instabilities, the ramp compensation is such that the feedback stage 10 is overcompensated to avoid the instability. This overcompensation slows down the transient response time of the circuit.

SUMMARY

An object of this disclosure is to provide a circuit and method for compensation of a feedback stage of a current mode buck converter that does not slow the response time of the current mode buck converter.

Another object of this disclosure is to provide a circuit and method for compensation of a feedback stage of a current mode buck converter that will adjust to changes in the in the inductor of the power stage of the current mode buck converter.

Further, another object of this disclosure is to provide a circuit and method for insure that a current mode buck converter is stabile over all duty cycles.

To accomplish at least one of these objects, a feedback section of a current mode buck converter includes low current level control circuit for establishing a low current level at which a switching stage within a power section of the current mode buck converter switches the direction of the slope of a current flowing through an inductor of the filter section of the power stage from a negative slope to a positive slope.

The low current level control circuit has a phase frequency detector connected to receive a converter control clock. The output of the phase frequency detector is connected to a loop filter that passes the low frequency and phase differences with the converter control clock to a low current comparator. The low current comparator has a second input that is a sensing of an inductor current magnitude of an inductor of the filter stage of the buck converter. The output of the low current comparator is a comparison of the inductor current magnitude and a low reference current level an switches between states dependent upon the level of the inductor current magnitude and the low reference current level. The output of the low current comparator is a second input to the phase frequency detector for comparison with the converter control clock to determine the low frequency and phase differences.

The feedback section now provides two levels of control, where the repetitive switching of the switching transistors are phase and frequency locked to the converter control clock. The feedback section has a high current level control circuit for establishing a high current level at which a switching stage within a power section of the current mode buck converter switches the direction of the slope of a current flowing through an inductor of the filter section of the power stage from a positive slope to a negative slope. The high current level control circuit has an error amplifier connected to an output terminal of the buck converter to receive the voltage level present at the output terminal. The output voltage level is compared with a reference voltage level applied to a second input of the error amplifier and any difference between the output voltage level and the reference voltage level to provide an error output signal indicative of the difference. The error output signal is applied to a high current comparator to be compared with the inductor current magnitude applied to the second input of the high current comparator.

The output of the high current comparator is applied to a set terminal of a set-reset latch and the output of the low current comparator is applied to a reset terminal of the set-reset latch. The output of the set-reset latch is applied to a driver circuit. The output of the driver circuit is applied to the switching section of the power stage. The switching section is formed of two transistors that are commonly connected to a first terminal of the inductor of the filter section. A second terminal of a first of the two transistors is connected to a power supply voltage source to connect the power supply voltage source to the first terminal of the inductor to cause the inductor current to have positive slope. A second terminal of a second of the two transistors is connected to a substrate supply reference voltage source to connect the substrate reference supply voltage source to the first terminal of the inductor to cause the inductor current to have a negative slope. A third terminal of each of the two transistors is connected to the driver circuit. In various embodiments, the first transistor is a PMOS transistor and the second transistor is an NMOS transistor, where the two gates of the PMOS transistor and the NMOS transistor are commonly connected the output of the driver circuit.

The filter section of the power stage of the buck converter has an output capacitor that is connected to a second terminal of the inductor and to the output terminal of the buck converter. The common connection of the inductor and output capacitor is connected such that the measurement of the inductor current magnitude is sensed with the connection to the second terminals of the low current comparator and the high current comparator.

In various embodiments, an apparatus for controlling the levels of repetitive switching of an output current of a current mode buck converter phase and frequency locks the switching frequency of the output current to an external clocking signal. Controlling the two levels of the output current bounds a current error and transforms it to a phase error to prevent error amplification such that the average current remains constant at any duty cycle. The controlling begins by sensing the output current magnitude and sensing an output voltage of the buck converter. The output of the output voltage is compared with a reference voltage to determine an error signal that is amplified to indicate a high output current level. The output voltage and the signal indicating the output current magnitude are compared to determine a high output current level.

A phase and frequency difference between a reset triggering pulse and the external clocking signal. Triggering the buck converter to maintain the output current between the high output current level and the low output current level. The low level output current level is adjusted to maintain the phase and frequency locking of the buck converter with the external clocking signal. By maintaining the phase and frequency locking of the switching of the buck converter with the external clocking signal the subharmonic frequency is eliminated over all duty cycles of the buck converter. Further, changes in the inductor value of the filter section of the buck converter are compensated for automatically.

BRIEF DESCRIPTION OF THE DRAWINGS

FIGS. 4a-4b are plots of the operational signals of the current mode buck converter of the related art as shown in FIG. 1.

DETAILED DESCRIPTION

A buck converter of the present disclosure consists of a power stage and a feedback control circuit. The power stage has a switching section and an output filter as is in the prior art. The feedback control circuit includes two control loops. A first control loop monitors the output voltage and the current flowing through the inductor and develops a high current control level for the inductor current magnitude to control the duty cycle of the power stage. The second control loop monitors the inductor current magnitude and develops a low current control level for the inductor current magnitude. A phase frequency detector determines any phase and frequency difference between an external clocking signal and a reset switching signal and locks the phase and frequency of the reset switching signal to the that of the external clocking signal.

The two control loops bound any current error and transform it into a phase error, therefore eliminating any current error amplification that causes subharmonic oscillation at duty cycles greater than 50%. This forces the average current through the inductor to remain the same at any duty cycle. The current mode buck converter of the present disclosure is then stable over all duty cycles. Further, the two control loops eliminate the necessity for ramp compensation as in the prior art. The two control loops enable the accommodation of modifications of the inductor value automatically.

Figure 3:
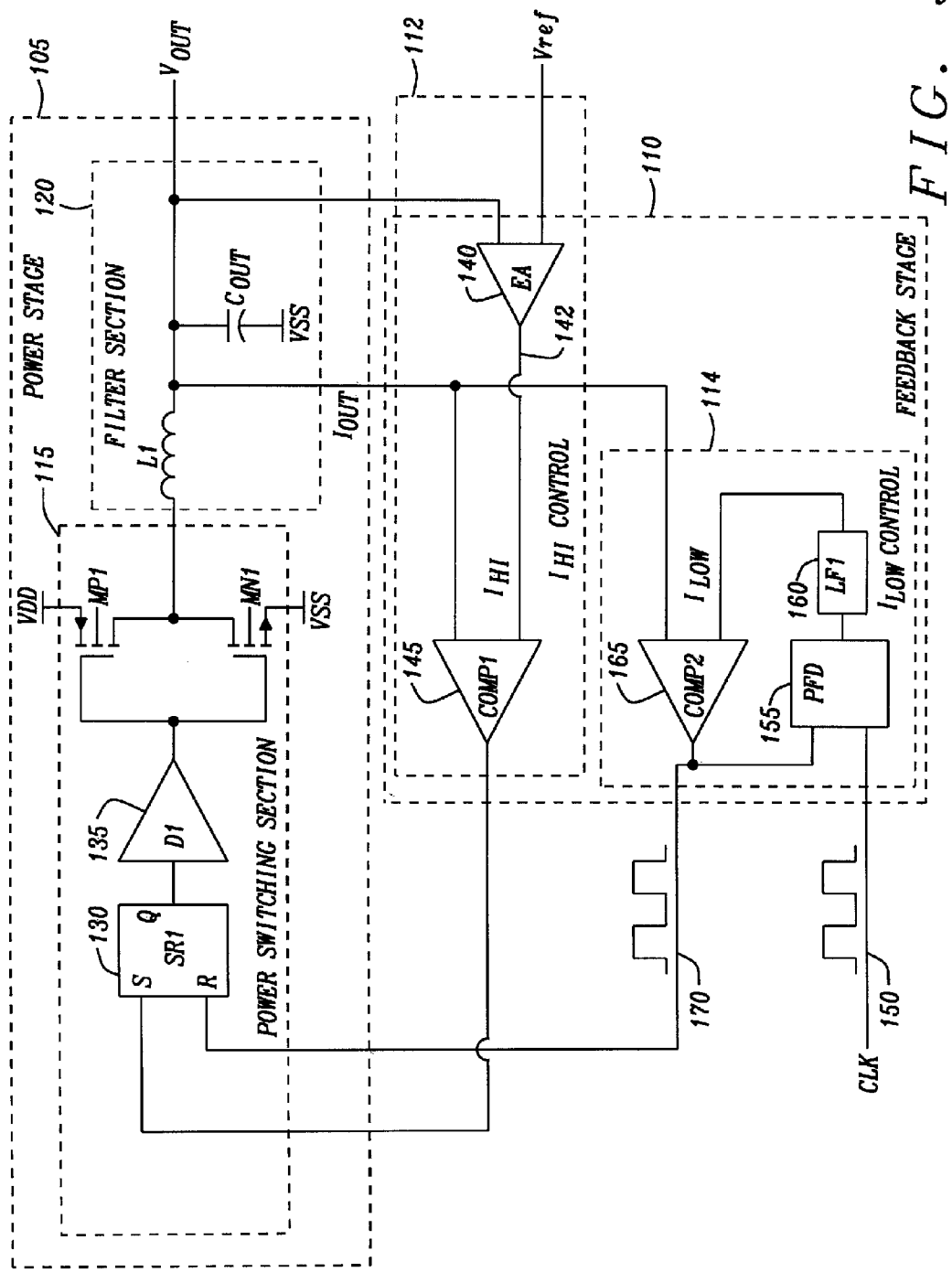
FIG. 3 is a schematic of a current mode buck converter of the present disclosure.

FIG. 3 is a schematic of a current mode buck converter of the present disclosure. Refer now to FIG. 3 for a more detailed description of a current mode buck converter of the present disclosure. The power switching section 115 of the power stage 105 has a set-reset latch 130. The output Q of the set-reset latch 130 is applied to the input of the driver D1. An output of the driver D1 is connected to the commonly connected gates of the PMOS transistor MP1 and the NMOS transistor MN1. The driver D1 conditions and buffers the output of the set-reset latch 130 for activating and deactivating the PMOS transistor MP1 and the NMOS transistor MN1. The source of the PMOS transistor MP1 is connected to the power supply voltage source VDD and the source of the NMOS transistor MN1 is connected to the substrate supply voltage source VSS. The substrate supply voltage source VSS is often the ground reference voltage source, but in some applications is a negative voltage level. The commonly connected drains of the PMOS transistor MP1 and the NMOS transistor MN1 are connected to an input terminal of the filter section 120. The input terminal is a first terminal of an inductor L1. Set input pulses are applied to the set input S of a set-reset latch 130 to trigger the set-reset latch 130 such that the PMOS transistor MP1 is turned off and the NMOS transistor MN1 is turned on. A current from the output capacitor $C_{OUT}$ flows from the second terminal of the inductor L1 out the first terminal of the inductor L1 to the substrate supply voltage source VSS with a constantly decreasing slope. A reset switching signal 170 is applied to the reset input R of the set-reset latch 130 to trigger the set-reset latch 130 such that the PMOS transistor MP1 is turned on and the NMOS transistor MN1 is turned off. A current from the power supply voltage source VDD flows from the first terminal of the inductor L1 out the second terminal of the inductor L1 into the first terminal of the output capacitor $C_{OUT}$ and to the substrate supply voltage source VSS with a constantly increasing slope.

As described above, the voltage ($V_{L1}$) across the inductor L1 is determined by the formula:

$$V_{L1} = L\frac{dI_L}{dt}$$

The output voltage $V_{OUT}$ is equal to the difference of the power supply voltage source and the voltage $V_{L1}$ across the inductor L1 in the on state and equal to the negative of the voltage $-V_{L1}$ across the inductor L1 in the off state. The duty cycle of the current mode buck converter determines the on state time and the off state time. It can be shown that the output voltage $V_{OUT}$ is equal to the duty cycle D of the current mode buck converter multiplied by the voltage level of the power supply voltage source VDD.

The feedback section 110 has two stages—a high current level control circuit 112 and a low current level control circuit 114. The feedback section has two inputs—a first input is the output voltage $V_{OUT}$ at the first terminal of the output capacitor $C_{OUT}$ and the second input is a sensing the magnitude of the output current $I_{OUT}$ through the inductor L1. In some embodiments the output current $I_{OUT}$ is sensed as the equivalent series resistance of the inductor L1 and is in fact determined as a voltage measurement across the inductor L1. In other embodiments, a magnetic pickup is used to sense the current present in the inductor L1. In still other embodiments, the output current $I_{OUT}$ is sensed as a voltage across a small resistor (not shown) placed in series with the inductor L1.

The output voltage $V_{OUT}$ is applied to the high current level control circuit 112 of the first input of the feedback section 110. The output voltage $V_{OUT}$ is applied the first input of an error amplifier 140. A second input of the error amplifier 140 received a reference voltage level Vref. The output 142 the error amplifier 140 is an error voltage that is the difference between the output voltage $V_{OUT}$ and the reference voltage level $V_{ref}$. The error voltage is applied to a negative input of a high current level comparator 145. The first input of the feedback section 110 is applied to the positive input of the high current level comparator 145 of the high current level control circuit 112. When the error voltage $V_{ERROR}$ indicates that the output current $I_{OUT}$ is greater than a high current level $I_{HI}$ as established from the reference voltage Vref, the high current level comparator 145 triggers the set input S of the set-reset latch 130 and the PMOS transistor MP1 is turned off and the NMOS transistor MN1 is turned on. The first terminal of the inductor L1 is then connected through the NMOS transistor MN1 to the substrate supply voltage source VSS. The slope of the output current $I_{OUT}$ decreases at the slope determined by the magnitude of the voltage across the inductor L1 and the value of the inductance of the inductor L1.

A third input to the feedback stage 110 is a clocking signal 150 for providing the locking frequency for controlling the switching of the power switching section 115. The clocking signal 150 is connected to a phase/frequency detector 155. In various embodiments, the clocking signal 150 is an external signal applied to the feedback stage 110. In other embodiments, a clock generator (not shown) is included with the feedback stage 110 for generating the clocking signal 150. A second input of the phase/frequency detector 155 is connected to receive a reset switching signal 170. The phase/frequency detector 155 compares the phase and frequency of the reset switching signal 170 and the clocking signal 150 to generate a phase/frequency error signal that is applied to a loop filter 160. The loop filter is a low pass filter that passes the lower frequency variations of the reset switching signal 170 from the clocking signal 150. This is a low current level signal $I_{LOW}$ that is used to establish the low current level of the output current $I_{OUT}$ through the inductor L1. The low current level signal $I_{LOW}$ is applied to a first terminal of a low current level comparator 165. The magnitude of the output current $I_{OUT}$ through the inductor L1 is applied to a second input of the low current level comparator 165. The output of the low current level comparator 165 is connected to the reset terminal R of the set-reset latch 130. When the magnitude of the output current $I_{OUT}$ is less than the low current level signal $I_{LOW}$, the low current level comparator 165 switches state to reset the set-reset latch 130. The output Q is applied through the driver circuit 135 and thus to the gates of the PMOS transistor MP1 and the NMOS transistor MN1. The PMOS transistor MP1 is turned on and the NMOS transistor MN1 is turned off. The first terminal of the inductor L1 is then connected through the PMOS transistor MP1 to the power supply voltage source VDD. The slope of the output current $I_{OUT}$ increases at the slope determined by the magnitude of the voltage across the inductor and value of the inductor L1.

Figure 1:
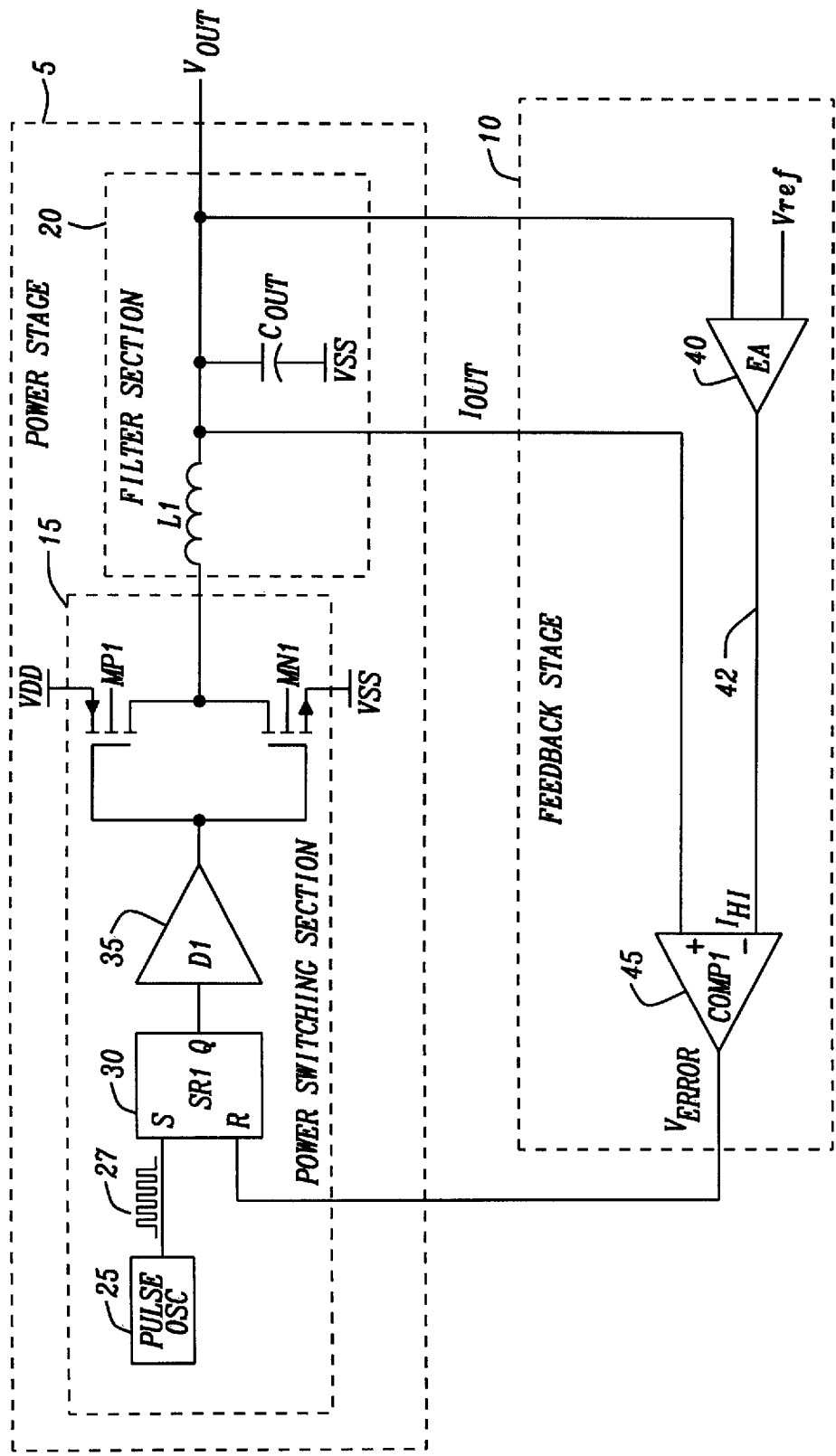
FIG. 1 is a schematic of a current mode buck converter of the related art.
Figure 2:
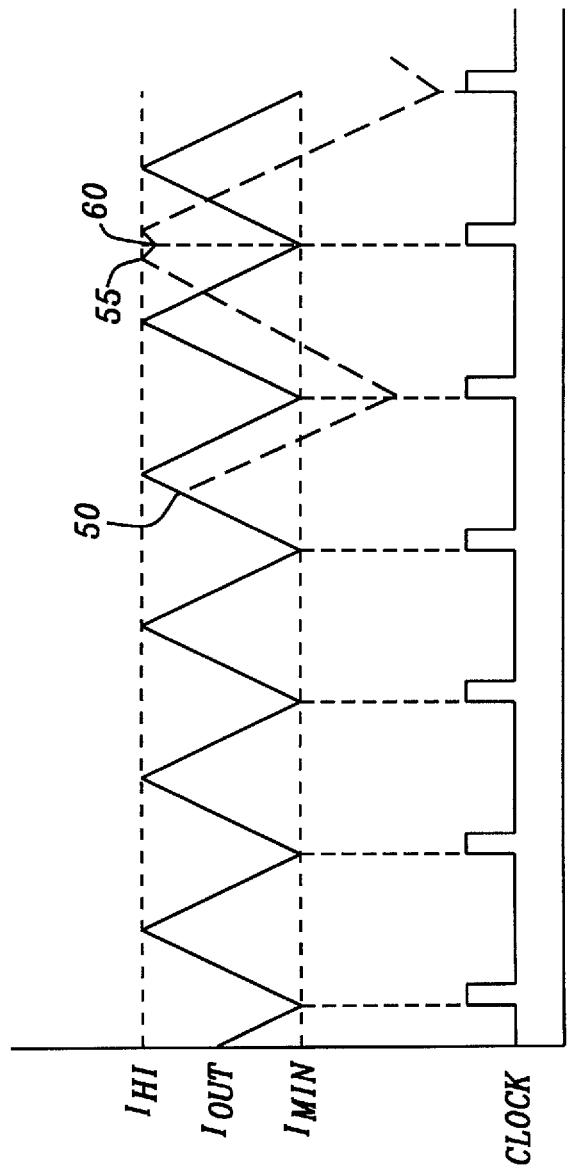
FIG. 2 is a plot of the inductor current and clocking signal of the current mode buck converter of FIG. 1.
Figure 4C:
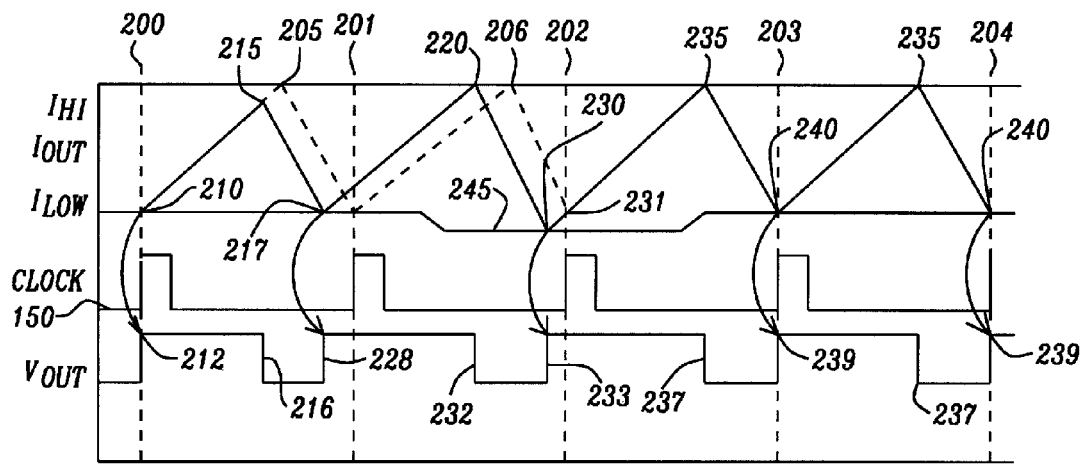
FIG. 4c is a plot of the operational signals of the current mode buck converter of the present disclosure as shown in FIG. 3.

FIGS. 4a-4b are plots of the operational signals of the current mode buck converter of the related art as shown in FIG. 1. FIG. 4c is a plot of the operational signals of the current mode buck converter of the present disclosure as shown in FIG. 3. In FIG. 1, the positive edge of the clock signal 27, as applied to the set input S of the set-reset latch 30 at the time 200, triggers 210 the PMOS transistor MP1 to turn on and the NMOS transistor MN1 to turn off. The output current $I_{OUT}$, in various embodiments, as shown, has a positively increasing slope until the magnitude of the output current $I_{OUT}$ achieve an amplitude equal to the high current level $I_{HI}$. As a result of the positive slope of the inductor current $I_{OUT}$, the output voltage $V_{OUT}$ increases 212 to a maximum value as determined by the positively increasing slope of the inductor current $I_{OUT}$ and the inductance value of the inductor L1. At that time, the output voltage $V_{OUT}$ is compared to the reference voltage $V_{ref}$ to form a high level error signal 42 that is applied to the negative terminal of the comparator 45. The sensed inductor current $I_{OUT}$ as applied to the comparator 45 is compared with the error signal 42. When the magnitude of the inductor current $I_{OUT}$ is greater than the error signal, the output signal of the comparator 45 causes the triggering 205 of the reset terminal R to reset the set-reset latch 30. This causes the PMOS transistor MP1 to turn off and the NMOS transistor MN1 to turn on. The slope of the inductor output current $I_{OUT}$ is now negative and the output voltage $V_{OUT}$ decreases to the low level 213. At the next rise of the clock pulse 27, the set-reset latch 30 is set to initiate the process reiteratively.

Referring to FIG. 4b, the positive edge of the clock signal 27, as described for FIG. 4a, triggers 210 the PMOS transistor MP1 to turn on and the NMOS transistor MN1 to turn off. The output current $I_{OUT}$ has a positively increasing slope until a false trigger event 215 prevents the output current $I_{OUT}$ from achieving the amplitude equal to the high current level $I_{HI}$ at the point 205. The false trigger causes the triggering 215 of the reset terminal R to reset the set-reset latch 30. This causes the PMOS transistor MP1 to turn off and the NMOS transistor MN1 to turn on. The slope of the inductor output current $I_{OUT}$ is now negative and the output current $I_{OUT}$ decreases to the low level 217 that is more negative than the low current level $I_{LOW}$. At the next rise of the clock pulse 27 at the time 201, the set-reset latch 30 is set and the PMOS transistor MP1 to turn on and the NMOS transistor MN1 to turn off. The magnitude of the output current $I_{OUT}$ has a positively increasing slope until the magnitude of the output current $I_{OUT}$ achieves an amplitude 220 equal to the high current level $I_{HI}$. The magnitude of the change of the output current $I_{OUT}$ is significantly larger than the normal operation. The set-reset latch 30 is reset and the PMOS transistor MP1 turns off and the NMOS transistor MN1 turns on. The output current $I_{OUT}$ has a negatively decreasing slope for a relatively small amount until the rising edge of the clock 27 at the time 202. The output current $I_{OUT}$ decreases a relatively small amount to the point 218, when the set-reset latch 30 is set and the PMOS transistor MP1 turns on and the NMOS transistor MN1 turns off. The output current $I_{OUT}$ now resumes the positively increasing slope at the point 218 until it reaches the high current level $I_{HI}$ at the point 221. In this period of time the output voltage $V_{OUT}$ traverses between its higher voltage level and its lower voltage 226 followed at a relatively short time later by a traverse from the lower voltage level to the higher voltage level 229 and then again a traverse from higher voltage level to the lower voltage level 227. With the filtering of the voltage, this causes a subharmonic noise to appear at the output voltage $V_{OUT}$.

When the magnitude of the output current $I_{OUT}$ reaches the high current level $I_{HI}$ at the point 221, the set-reset latch 30 is reset and the PMOS transistor MP1 turns off and the NMOS transistor MN1 turns on. The output current $I_{OUT}$ has a negatively decreasing slope for the remaining period of the clock cycle to the point 219. The rising edge of the clock 27 at the time 203 sets the set-reset latch 30 to cause PMOS transistor MP1 to turn on and the NMOS transistor MN1 to turn off. The output current $I_{OUT}$ now resumes the positively increasing slope at the point 219 until it reaches the high current level $I_{HI}$ at the point 220. The set-reset latch is reset to cause the PMOS transistor MP1 to turn off and the NMOS transistor MN1 to turn on. The output current $I_{OUT}$ now resumes the negatively decreasing slope at the point 220 until it reaches the point 222. The set-reset latch is set to cause PMOS transistor MP1 to turn on and the NMOS transistor MN1 to turn off. The output current $I_{OUT}$ now resumes the positively increasing slope at the point 222 until it reaches the high current level $I_{HI}$ at the point 221.

The current error is accumulated and amplified for the duty cycles greater than 50%. The fixed frequency of the buck converter is no longer maintained and the ripple of the output voltage $V_{OUT}$ is no longer maintained because of the long charge and discharge times during the cycles.

To eliminate the current error of the related art, the feedback section 110 of FIG. 3 has two stages—the high current level control circuit 112 and a low current level control circuit 114. Referring to FIG. 4c, the operation has the output current $I_{OUT}$ attaining the low current level $I_{LOW}$ 210 and the set-reset latch 130 being reset at the time 200 causing the PMOS transistor MP1 to turn on and the NMOS transistor MN1 to turn off. The output current $I_{OUT}$ has positively increasing slope that would trigger the setting of the set-reset latch 130 at the point 205. However, a false triggering 215 causes the PMOS transistor MP1 to turn off and the NMOS transistor MN1 to turn on prematurely. The output current $I_{OUT}$ has negatively decreasing slope that would trigger the resetting of the set-reset latch 130 at the point 217 when the output current $I_{OUT}$ attains the low current level $I_{LOW}$. The error current is now a phase error with the magnitude of the output current $I_{OUT}$ essentially being parallel with the intended waveform that would be rising with the positively increasing slope from the positive edge of the clock at the time 201 to the point 206.

The phase-frequency detector 155 detects this phase error with the clocking signal 150 and after passing through the low pass filter 160, lowers the level of the low current level $I_{LOW}$ to the level 245 such that when the magnitude of the output current $I_{OUT}$ triggers the reset of the set-reset latch 130, the trigger point is essentially lined up such that the output current $I_{OUT}$ is now locked in phase with the clocking signal 150. At the reset of the set-reset latch 130, the output current $I_{OUT}$ has the positively increasing slope that intersects at point 231 with the intended phase of the magnitude of the output current $I_{OUT}$ and proceeds to the high current level $I_{HI}$ trigger point 235. The output current $I_{OUT}$ is now in phase with the clocking system such that after the set-reset clock 235 is set at the point 235, it is reset synchronously with the rising edge of the clock signal 150 at the point 240. The output current $I_{OUT}$ remains in phase and frequency lock with the clocking signal 150 until another false trigger 215. When that occurs, the low current level control circuit 114 adjusts the low current level $I_{LOW}$ to resynchronize the output current $I_{OUT}$ with the clock signal 150.

Figure 5:
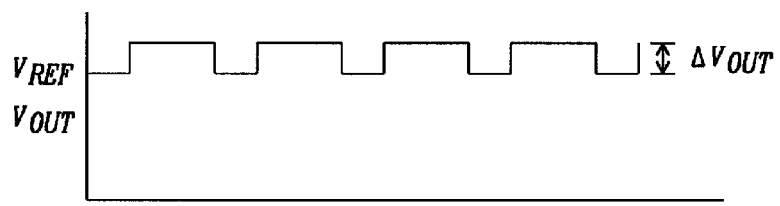
FIG. 5 is a plot of the output voltage of the current mode buck converter of the present disclosure as shown in FIG. 3 as compared with a reference voltage.

FIG. 5 is a plot of the output voltage $V_{OUT}$ of the current mode buck converter of the present disclosure as shown in FIG. 3 as compared with a reference voltage $V_{REF}$. The ripple of the output voltage $V_{OUT}$ is centered on the reference voltage $V_{REF}$ and controlled to the upper and lower levels of the inductor output current $I_{OUT}$ as developed across the equivalent series resistance (ESR) of the output capacitor $C_{OUT}$.

Figure 6:
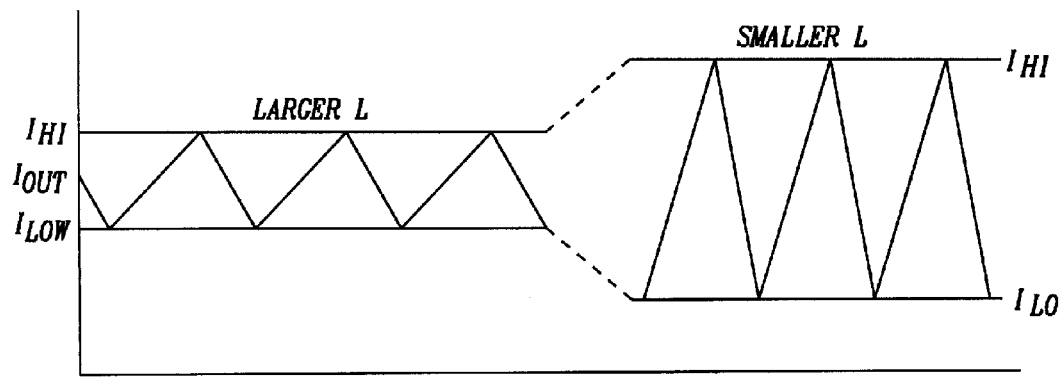
FIG. 6 is a plot of the output current of the current mode buck converter of the present disclosure as shown in FIG. 3 illustrating a change in inductance of the current mode buck converter.

FIG. 6 is a plot of the output current $I_{OUT}$ through the inductor L1 of the current mode buck converter of the present disclosure as shown in FIG. 3 illustrating a change in inductance of the inductor L1. As is known in the art, the change in the current through an inductor is equal to the ratio of the voltage across the inductor and the inductance of the inductor itself. If the value of the inductance of the inductor L1 decreases due to changes in temperature, the beginning of saturation of the inductor L1, or other transient phenomena, the changes appears a phase/frequency difference in phase detector 155 of the low current level circuit 114. As described above, the low current level $I_{LOW}$ is adjusted to cause the output current $I_{OUT}$ of the inductor L1 to be adjusted to cause the phase and frequency to align correctly. In FIG. 6, the inductance of the inductor decreases (Larger L® Smaller L) and the phase/frequency detector determines that the output current $I_{OUT}$ is no longer in phase/frequency lock with the clock signal 150. The low current level $I_{LOW}$ is adjusted to cause the output current $I_{OUT}$ to lock with the clocking signal 150 and the magnitude of the output current $I_{OUT}$ is now function with the correct amplitudes for the new inductance value of the inductor L1.

When a change in inductance of the inductor L1 (e.g. lower inductance), it is assumed that the high current level $I_{HI}$ is unchanged for the moment. The larger (faster) slope on rising and falling output current $I_{OUT}$ is causes the resulting frequency to increase. This, in turn, causes the phase/frequency detector 155 to react and reduce the lower low current level $I_{LOW}$ 210 threshold to maintain the phase lock and restore the frequency of the reset switching signal 170 to be equal to the clocking signal 150.

Upon maintaining the phase lock and restoring the frequency the current ripple of the output current $I_{OUT}$ is now larger and therefore the average current has decreased causing the output voltage $V_{OUT}$ to similarly decrease. The error amplifier 140 will then increase the high current level $I_{HI}$ until the averaged output current $I_{OUT}$ equals the load current and having stabilized the output voltage $V_{OUT}$ again. When this is achieved the (divided) output voltage $V_{OUT}$ and reference voltage Vref are then equal at the input of the error amplifier 140.

The structure of the present disclosure is derived such that the output current $I_{OUT}$ is a difference from the upper current level. This maintains the ripple current as a constant even when the error amplifier 140 modifies the upper level. This helps maintain the phase lock, hence a stable current ripple even when the load current is changing. If the high current level $I_{HI}$ and the low current level $I_{LOW}$ are independent, a more complicated behavior occurs, where a change on one level forces a reaction on the other current level. This is a more complicated solution, which requires more careful design of the two feedback loops.

Figure 7:
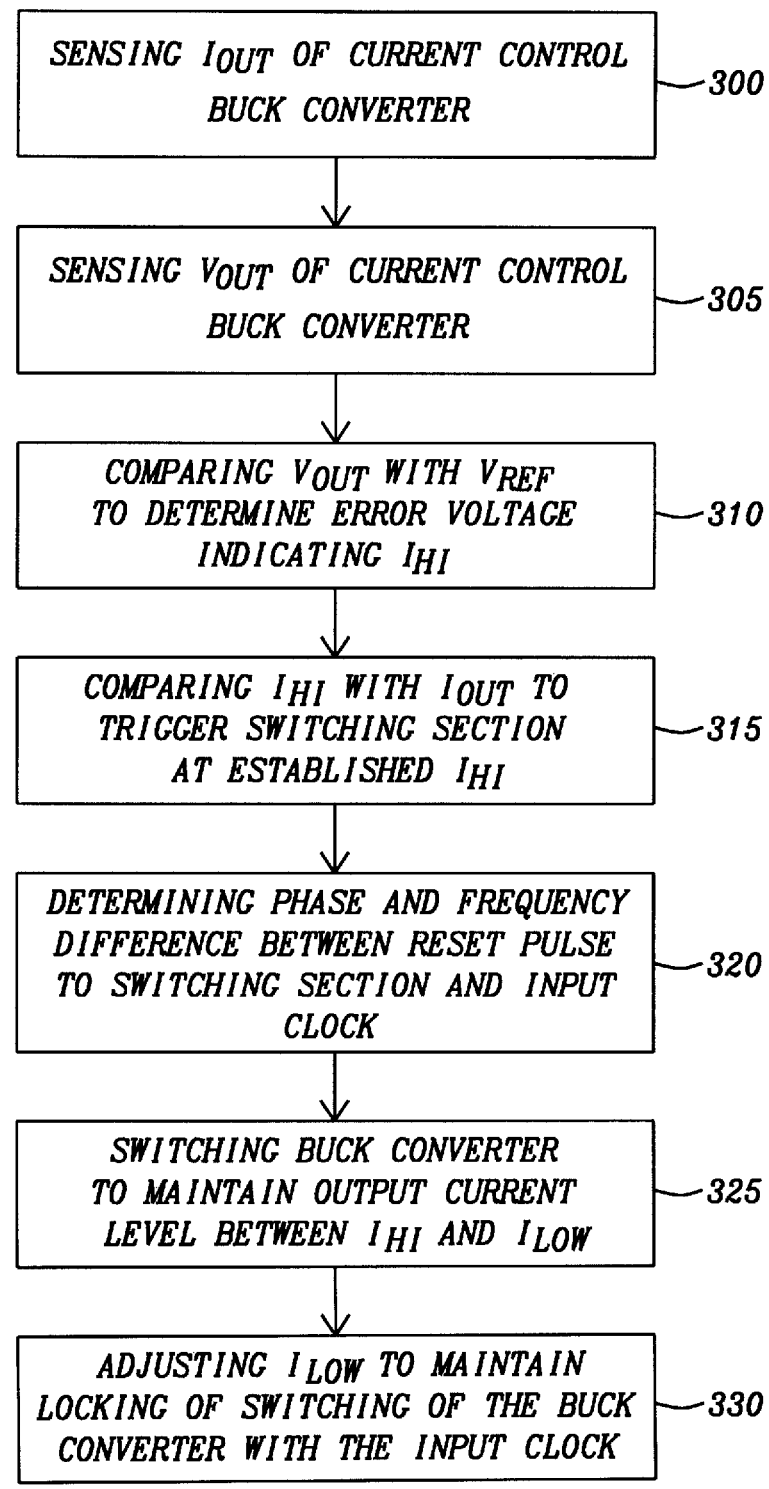
FIG. 7 is a flow chart for a method for controlling the levels of repetitive switching of an output current of the current mode buck converter of the present disclosure as shown in FIG. 3.

FIG. 7 is a flow chart for a method for controlling the levels of repetitive switching of an output current of the current mode buck converter of the present disclosure as shown in FIG. 3. An apparatus for controlling the levels of repetitive switching of an output current $I_{OUT}$ of a current mode buck converter phase and frequency locks the switching frequency of the output current $I_{OUT}$ to an external clocking signal 150. Controlling the two levels $I_{HI}$ and $I_{LOW}$ of the output current $I_{OUT}$ bounds a current error and transforms it to a phase error to prevent error amplification such that the average current remains constant at any duty cycle. The controlling begins by sensing a magnitude of the output current $I_{OUT}$ (Box 300) and sensing an output voltage $V_{OUT}$ (Box 305) of the buck converter. The output voltage $V_{OUT}$ is compared with a reference voltage $V_{REF}$ to determine an error signal that is amplified to indicate (Box 310) a high output current level $I_{HI}$. The output voltage and the signal indicating the magnitude of the output current $I_{OUT}$ are compared (Box 315) to establish the high level switching point for the output current $I_{OUT}$.

A phase and frequency difference between a reset triggering pulse and the external clocking signal is determined (Box 320). Triggering (Box 325) the buck converter to maintain the output current $I_{OUT}$ between the high output current level $I_{HI}$ and the low output current level $I_{LOW}$. The low level output current level $I_{LOW}$ is adjusted (Box 330) to maintain the phase and frequency locking of the buck converter with the external clocking signal, if the output current $I_{OUT}$ is falsely triggered. By maintaining the phase and frequency locking of the switching of the buck converter with the external clocking signal 150 the subharmonic frequency is eliminated over all duty cycles of the buck converter. Further, changes in the inductor value of the filter section of the buck converter are compensated for automatically.

While this disclosure has been particularly shown and described with reference to the preferred embodiments thereof, it will be understood by those skilled in the art that various changes in form and details may be made without departing from the spirit and scope of the disclosure.

What is claimed is:

1. A feedback apparatus within a current mode buck converter comprising:
   a first current level control circuit for establishing a first current level at which a switching stage within a power section of the current mode buck converter switches a direction of a slope of a current flowing through an inductor of the filter section of the power section from a first directional slope to a second oppositely directional slope; and
   a second current level control circuit for establishing a second current level at which the switching stage within the power section of the current mode buck converter switches the direction of the slope of the current flowing through the inductor of the filter section of the power section from the second oppositely directional slope to the first directional slope;

wherein the second current level control circuit phase and frequency locks the current flowing through the inductor with a converter control clock applied to the second current level control circuit such that when the current flowing through the inductor is incorrectly triggered, the second current level is adjusted to lock the phase and frequency of the current flowing through the inductor to the converter control clock.

2. The feedback apparatus of claim 1 wherein the second current level control circuit comprises:
 a phase/frequency detector connected to receive the converter control clock;
 a loop filter connected to an output of the phase/frequency detector pass low frequency and phase differences with the converter control clock to generate an indicator of the second current level;
 a second current comparator connected to receive the indicator of the second current level, connected to receive an indicator of a magnitude of the current flowing through the inductor to compare the indicator of the second current level with magnitude of the current flowing through the inductor to provide a comparison signal indicating if the current flowing through the inductor is greater than or lesser than the second current level, and connected to the phase/frequency detector to transfer the comparison signal with the converter control clock to generate the second current level.

3. The feedback apparatus of claim 2 wherein the second current comparator is connected to a reset terminal of a set-reset latch of the power section of the buck converter to reset the set-reset latch to cause the current flowing through the inductor to have the first directional slope.

4. The feedback apparatus of claim 3 wherein the first current level control circuit comprises:
 an error amplifier connected to an output terminal of the buck converter to receive an output voltage level present at the output terminal and connected to a reference voltage source to compare the output voltage level with a reference voltage to determine any difference between the output voltage level and the reference voltage level to generate an error output signal indicative of the difference; and
 a second current comparator connected to the buck converter to receive the magnitude of the current flowing through the inductor, connected to the error amplifier to receive the error output signal, and connected to a set terminal of the set-reset latch to cause the current flowing through the inductor to have the second oppositely directional slope.

5. A current mode buck converter comprising:
 a power stage for converting a higher power supply source to a lower output voltage level;
 a feedback stage in communication with the power stage for controlling the levels of repetitive switching of an output current by phase and frequency locking a switching frequency of the output current to an external clocking signal and controlling two levels of output current bounds by transforming a current error to a phase error to prevent error amplification such that an average output current remains constant at any duty cycle.

6. The current mode buck converter of claim 5 wherein the feedback stage comprises:

a first current level control circuit for establishing a first current level at which the power stage of the current mode buck converter switches a direction of a slope of a current flowing through the power stage from a first directional slope to a second oppositely directional slope; and
 a second current level control circuit for establishing a second current level at which the power stage of the current mode buck converter switches the direction of the slope of the current flowing through the power stage from the second oppositely directional slope to the first directional slope;
 wherein the second current level control circuit phase and frequency locks the current flowing through the power stage with a converter control clock applied to the second current level control circuit such that when the current flowing through the power stage is incorrectly triggered, the second current level is adjusted to lock the phase and frequency of the current flowing through the power stage to the converter control clock.

7. The current mode buck converter of claim 6 wherein the second current level control circuit comprises:
 a phase/frequency detector connected to receive the converter control clock;
 a loop filter connected to an output of the phase/frequency detector for passing low frequency and phase differences with the converter control clock to generate an indicator of the second current level;
 a second current comparator connected to receive the indicator of the second current level, connected to receive an indicator of a magnitude of the current flowing through the power stage to compare the indicator of the second current level with magnitude of the current flowing through the power stage to provide a comparison signal indicating if the current flowing through the power stage is greater than or lesser than the second current level, and connected to the phase/frequency detector to transfer the comparison signal with the converter control clock to generate the second current level.

8. The current mode buck converter of claim 6 wherein the second current comparator is connected to the power stage to transfer a reset switching signal to cause the current flowing through the power stage to have the first directional slope.

9. The current mode buck converter of claim 7 wherein the first current level control circuit comprises:
 an error amplifier connected to an output terminal of the buck converter to receive an output voltage level present at the output terminal and connected to a reference voltage source to compare the output voltage level is compared with a reference voltage to determine any difference between the output voltage level and the reference voltage level to generate an error output signal indicative of the difference; and
 a third current comparator having a first input connected to the buck converter to receive the magnitude of the current flowing through the inductor, a second input connected to the error amplifier to receive the error output signal, and an output connected to a set terminal of the set-reset latch to transfer a set switching signal to cause the current flowing through the power stage to have the second oppositely directional slope.

10. The current mode buck converter of claim 5 wherein the power stage comprises:
 a switching section connected to the power supply voltage source and a substrate supply voltage source; and a filter section connected to the switch section wherein the switch section alternately connects the power supply voltage source and the substrate supply voltage source to the filter section.

11. The current mode buck converter of claim 10 wherein the switching section comprises:
   a set-reset latch having a set terminal connected to receive the set switching signal, a reset terminal connected to receive the reset switching signal, and a data output terminal for transferring an output signal;
   a first transistor of a first conductivity type having a source connected to the power supply voltage source, a gate in communication with the set-reset latch to receive the output signal, and a drain connected to the filter section to provide the current flowing through the power stage from the power supply voltage source; and
   a second transistor of a second conductivity type having a source connected to the substrate supply voltage source, a gate in communication with the set-reset latch to receive the output signal, and a drain connected to the filter section to sink the current flowing through the power stage from the substrate supply voltage source.

12. The current mode buck converter of claim 11 wherein the switching section further comprises:
   a driver having an input connected to the data output terminal of the set-reset latch and an output to the gates of the first and second transistors to condition the output signal from the set-reset latch for driving the first and second transistors.

13. The current mode buck converter of claim 11 wherein the filter section comprises:
   an inductor having a first terminal connected to the commonly connected sources of the first and second transistor for transferring the current flowing through the power stage from the power supply voltage source during the first directional slope of the current flowing through the power stage or to the substrate supply voltage source during the second oppositely directional slope of the current flowing through the power stage; and
   an output capacitor having a first terminal connected to a second terminal of the inductor and a second terminal connected to the substrate supply voltage source for charging to an output voltage level based on the a duty cycle of the switching frequency of the output current, wherein the second terminal of the inductor and the first terminal of the capacitor are connected to an output terminal of the filter section to provide an output voltage and current to an output load connected to the output terminal.

14. The current mode buck converter of claim 13 wherein the output terminal is in communication with the feedback stage to transfer the indicator of the magnitude of the current flowing through the power stage.

15. The current mode buck converter of claim 14 wherein the indicator of the magnitude of the current flowing through the power stage is a voltage drop across an equivalent series resistance of the inductor, a voltage developed across a resistor in series with the inductor, or a voltage developed as a magnetic pickup from the current flowing through the power stage.

16. A method for controlling the levels of repetitive switching of an output current of a current mode buck converter comprising the steps of:
   phase and frequency locking the switching frequency of the output current to an external clocking signal;
   controlling bounds of two levels of the output current;
   determining a current error of the output current for each of the two bounds of the two level of the output current;
   forcing the output current to remain within a first of the two bounds; and
   transforming the current error of the output current from a second of the two bounds to a phase error for preventing error amplification such that an average current remains constant at any duty cycle.

17. The method for controlling the levels of repetitive switching of the output current of the current mode buck converter of claim 16 wherein transforming the current error comprises the steps of:
   forming a reset triggering pulse by comparing an indication of the second of the two bounds and the output current, wherein the reset triggering pulse changes state when the output current is greater than and less than the indication of the second of the two bounds;
   transforming phase and frequency difference between the reset triggering pulse and the external clocking signal;
   triggering the buck converter to maintain the output current between the first output current level and the second output current level;
   adjusting the second level output current level to maintain the phase and frequency locking of the buck converter with the external clocking signal to maintain the phase and frequency locking of the switching of the buck converter with the external clocking signal such that subharmonic noise is eliminated over all duty cycles of the buck converter.

18. The method for controlling the levels of repetitive switching of the output current of the current mode buck converter of claim 17 wherein adjusting the second level output current permits changes in an inductor value of a filter section of the buck converter are compensated for automatically.

19. The method for controlling the levels of repetitive switching of the output current of the current mode buck converter of claim 16 wherein controlling comprises:
   sensing a magnitude of the output current;
   sensing an output voltage of the buck converter;
   comparing the output of the output voltage with a reference voltage to determine an error signal that is amplified to indicate a first output current level;
   comparing the signal indicating the magnitude of the output current to the first output current level for determining that the magnitude of the output current has exceeded the first output current level; and
   switching a slope of the output current to a first directional slope.

20. An apparatus for controlling the levels of repetitive switching of an output current of a current mode buck converter comprising:
   means for phase and frequency locking the switching frequency of the output current to an external clocking signal;
   means for controlling bounds of two levels of the output current;
   means for determining a current error of the output current for each of the two bounds of the two level of the output current;
   means for forcing the output current to remain within a first of the two bounds; and
   means for transforming the current error of the output current from a second of the two bounds to a phase error for preventing error amplification such that an average current remains constant at any duty cycle.

21. The apparatus for controlling the levels of repetitive switching of the output current of the current mode buck converter of claim 20 wherein means for transforming the current error comprises:
- means for forming a reset triggering pulse by comparing an indication of the second of the two bounds and the output current, wherein the reset triggering pulse changes state when the output current is greater than and less than the indication of the second of the two bounds;
- means for transforming phase and frequency difference between the reset triggering pulse and the external clocking signal;
- means for triggering the buck converter to maintain the output current between the first output current level and the second output current level;
- means for adjusting the second level output current level to maintain the phase and frequency locking of the buck converter with the external clocking signal to maintain the phase and frequency locking of the switching of the buck converter with the external clocking signal such that subharmonic noise is eliminated over all duty cycles of the buck converter.

22. The apparatus for controlling the levels of repetitive switching of the output current of the current mode buck converter of claim 21 wherein means for adjusting the second level output current permits changes in an inductor value of a filter section of the buck converter are compensated for automatically.

23. The apparatus for controlling the levels of repetitive switching of the output current of the current mode buck converter of claim 16 wherein means for controlling comprises:
- means for sensing a magnitude of the output current;
- means for sensing an output voltage of the buck converter;
- means for comparing the output of the output voltage with a reference voltage to determine an error signal that is amplified to indicate a first output current level;
- means for comparing the signal indicating the magnitude of the output current to the first output current level for determining that the magnitude of the output current has exceeded the first output current level; and
- means for switching a slope of the output current to a first directional slope.

\* \* \* \* \*